Figure 1:
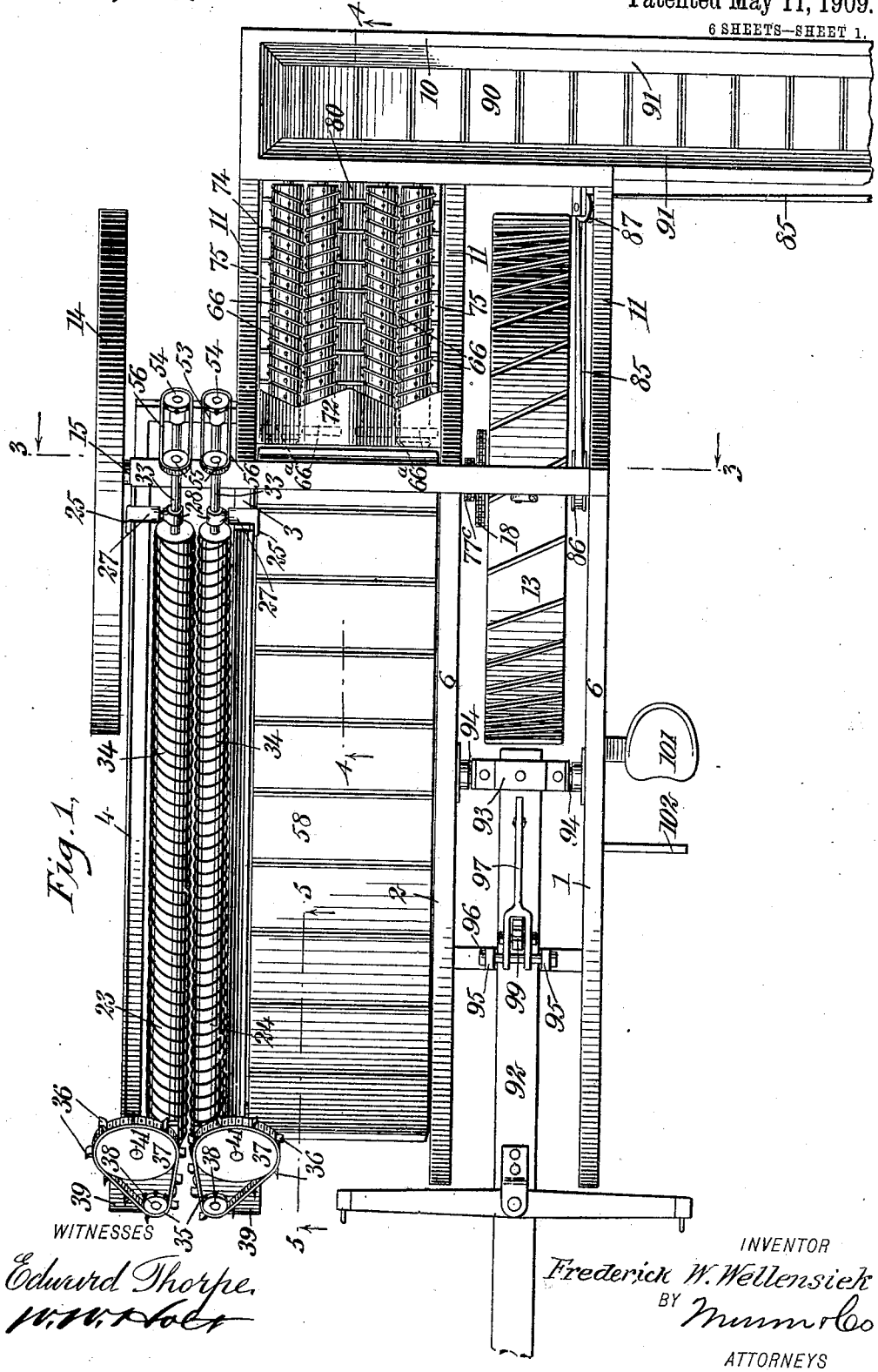

F. W. WELLENSIEK.
CORN HARVESTING AND HUSKING MACHINE.
APPLICATION FILED FEB. 26, 1907.

921,490.

Patented May 11, 1909.

6 SHEETS—SHEET 1.

WITNESSES
Edward Thorpe

INVENTOR
Frederick W. Wellensiek
BY
Munn & Co
ATTORNEYS

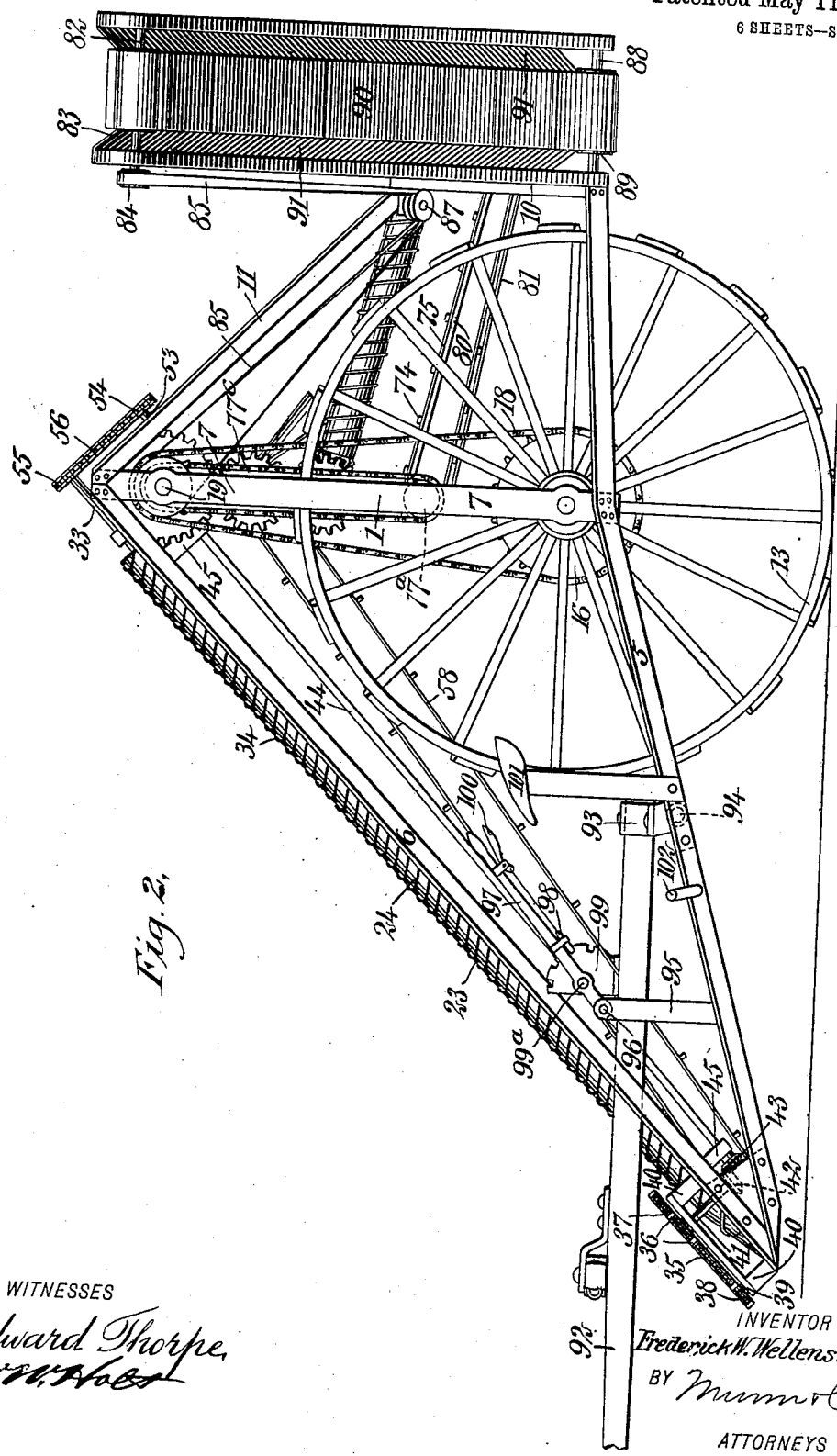

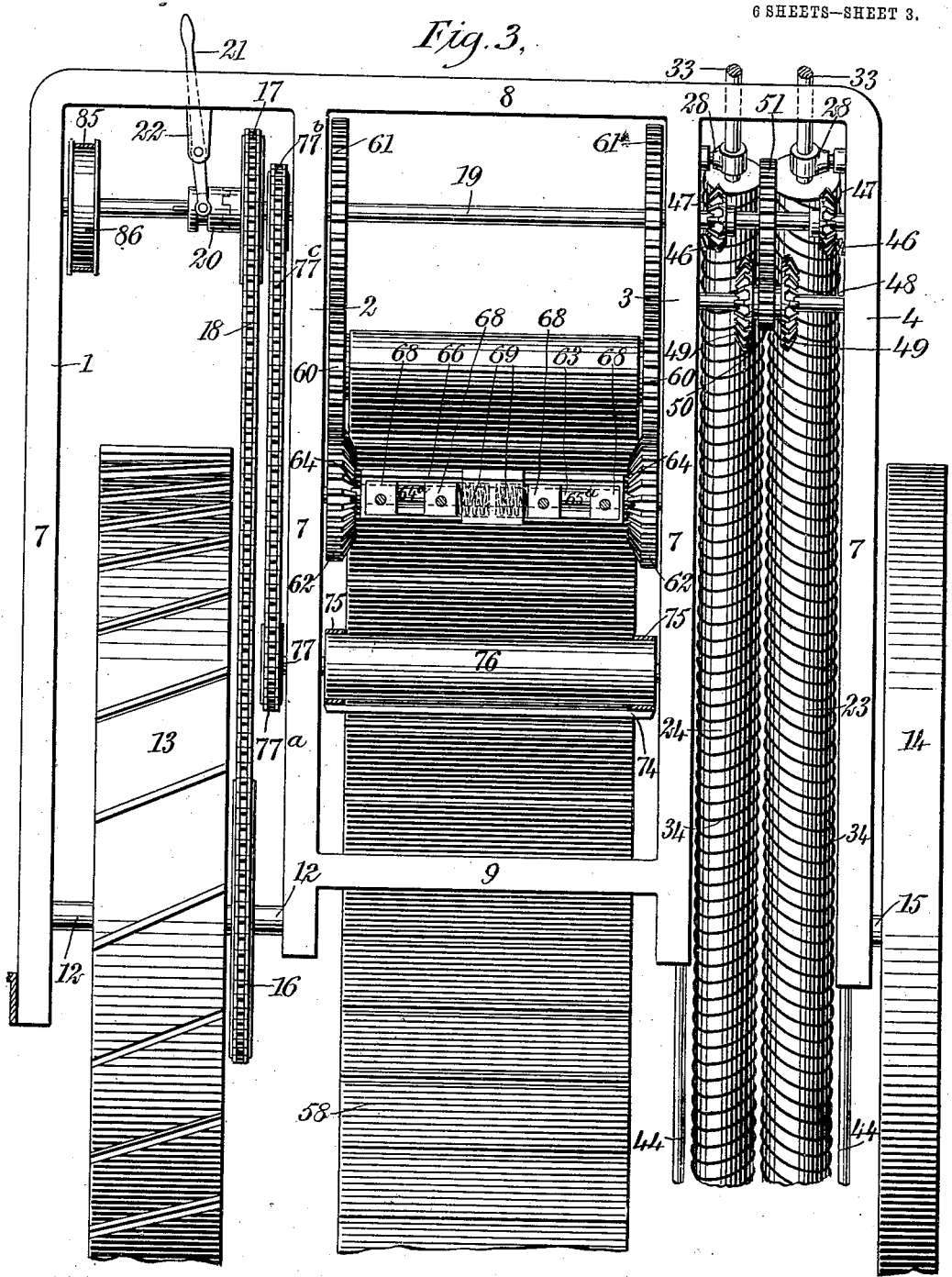

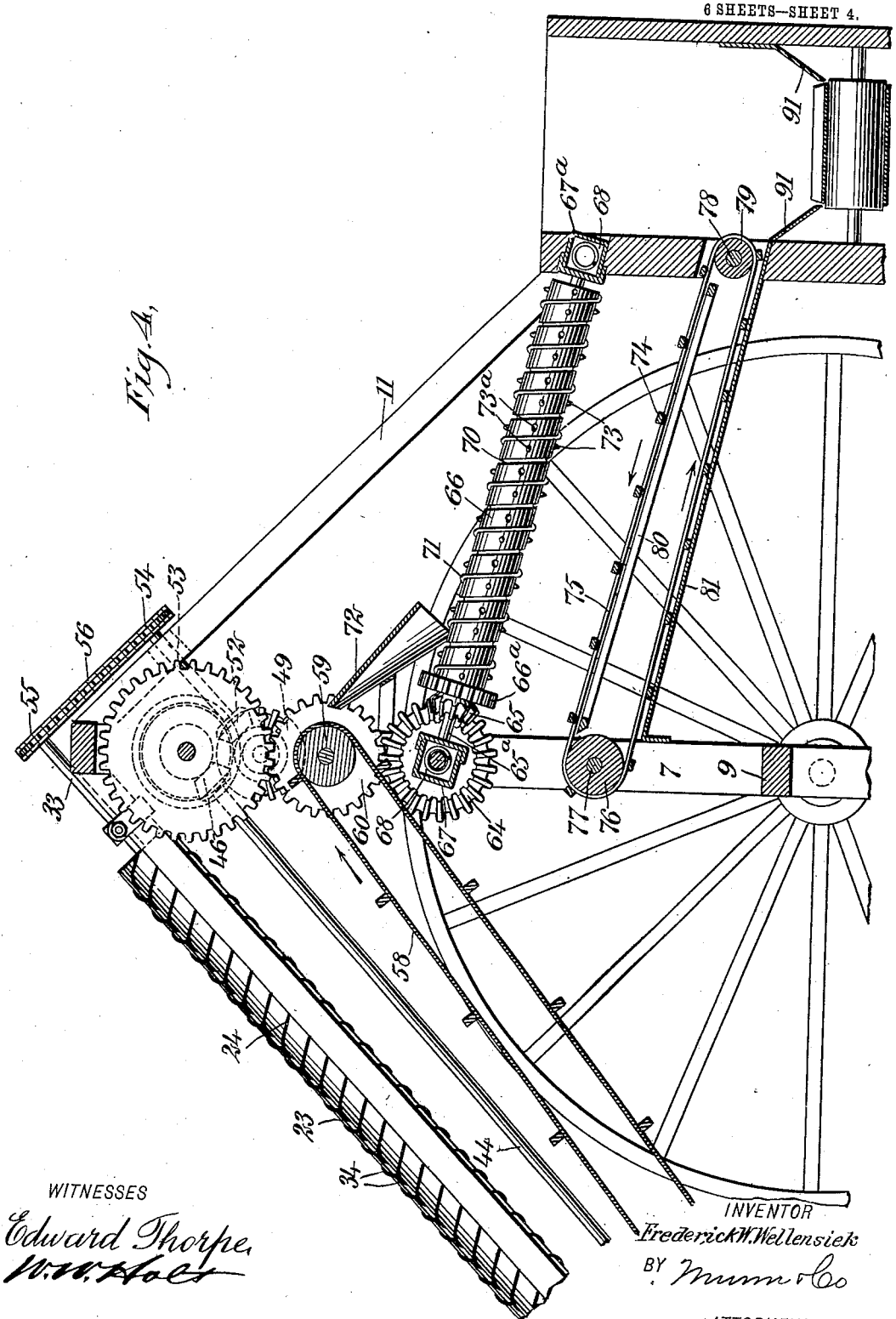

F. W. WELLENSIEK.
CORN HARVESTING AND HUSKING MACHINE.
APPLICATION FILED FEB. 26, 1907.
921,490.
Patented May 11, 1909.
6 SHEETS—SHEET 5.
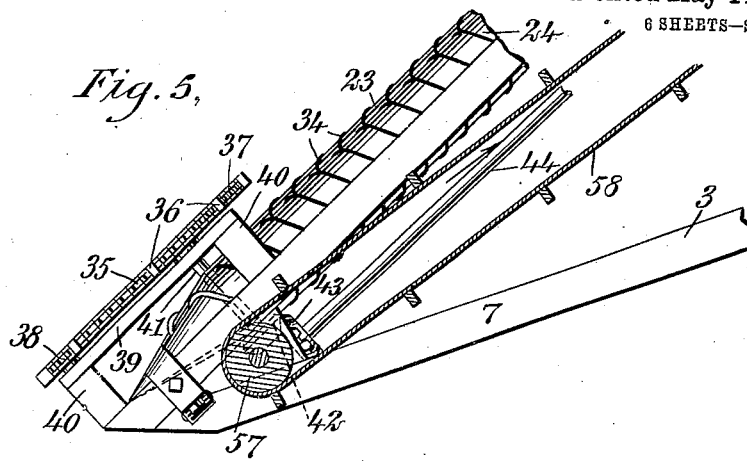
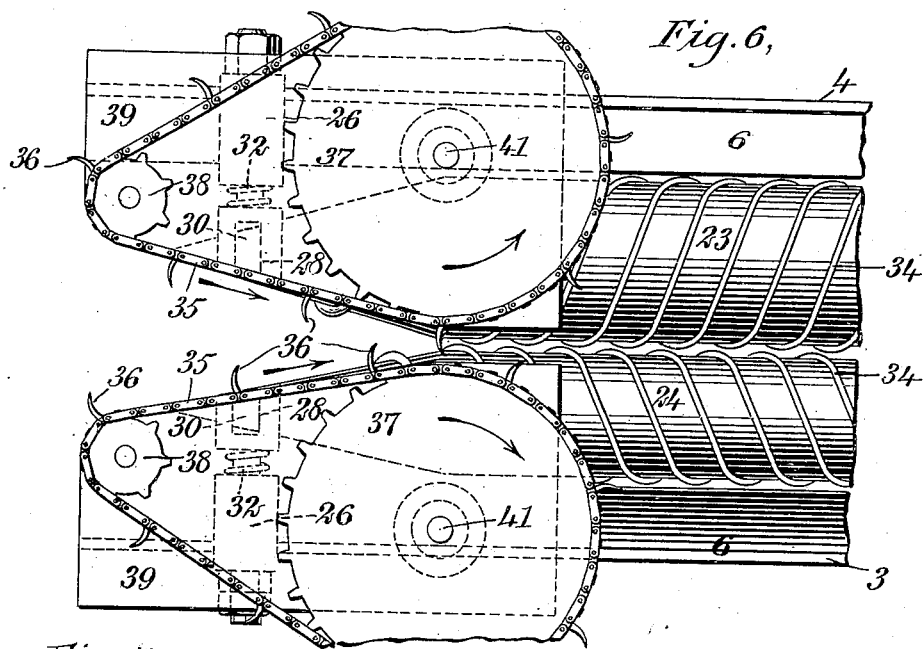
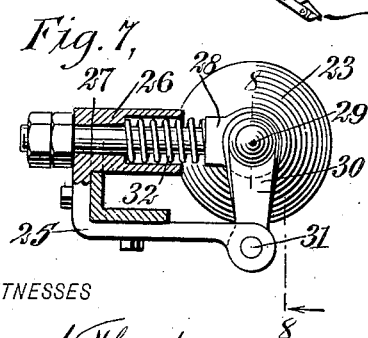
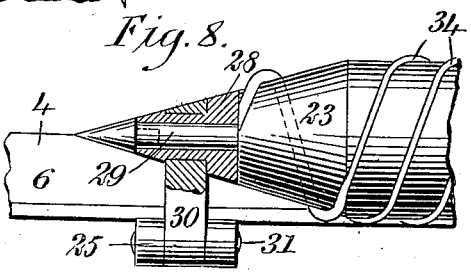
WITNESSES
Edward Thorpe
INVENTOR
Frederick W. Wellensiek
BY Munn & Co
ATTORNEYS

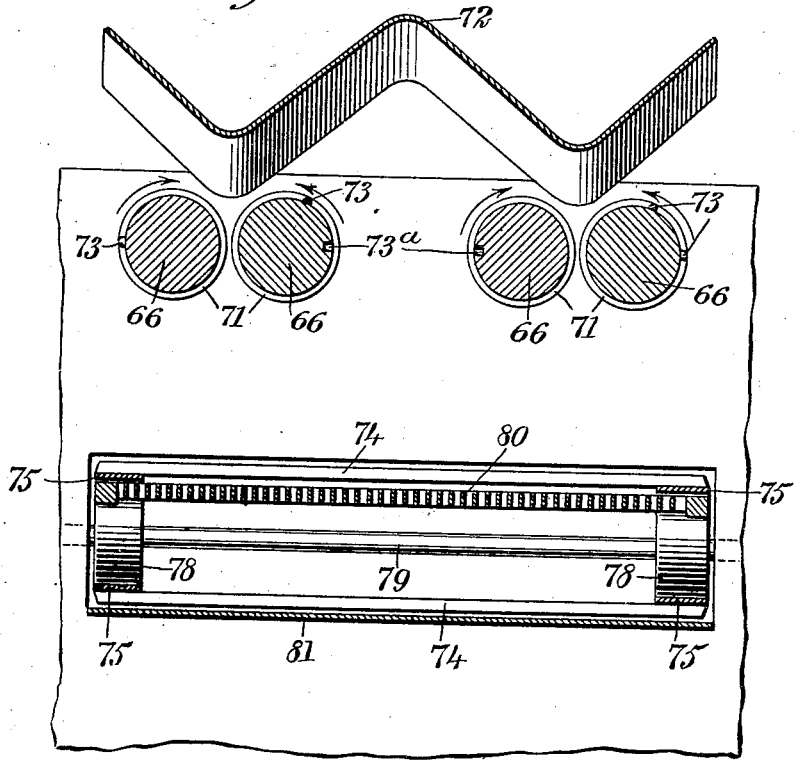

UNITED STATES PATENT OFFICE.

FREDERICK W. WELLENSIEK, OF SYRACUSE, NEBRASKA.

CORN HARVESTING AND HUSKING MACHINE.

No. 921,490.  Specification of Letters Patent.  Patented May 11, 1909.

Application filed February 26, 1907. Serial No. 359,428.

*To all whom it may concern:*

Be it known that I, FREDERICK W. WELLENSIEK, a citizen of the United States, and a resident of Syracuse, in the county of Otoe and State of Nebraska, have invented a new and Improved Corn Harvesting and Husking Machine, of which the following is a full, clear, and exact description.

The machine is designed to positively remove the ears of corn from the stalks as it moves over the field, provision being made for the lateral yielding separation of the picking rolls by which the harvesting is accomplished, thus preventing the choking of said rolls when in operation. The inside picking roll is preferably made slightly smaller in diameter than the opposite roll, whereby the ears of corn when detached from the stalk, will fall to the inside of the machine, being thereafter transported and discharged upon husking rolls. These latter rolls, which in the embodiment of the invention hereinafter described, are arranged in two pairs, are also laterally yielding, and after removing the leaves or husks from the ears, discharge on an open-faced apron movable over a riddle, the apron ejecting the husks from the machine and conveying the grain passing through the riddle, to a receptacle supported at the rear of the husking rolls. An elevator leads from the receptacle and discharges the grain directly into a wagon or other means for receiving it.

Reference is to be had to the accompanying drawings forming a part of this specification, in which similar characters of reference indicate corresponding parts in all the figures.

Figure 1 is a plan of the machine with the tongue and rear elevator partly broken away; Fig. 2 is a left-hand side elevation of the machine; Fig. 3 is a cross section substantially on the line 3—3 of Fig. 1, looking in the direction of the arrow; Fig. 4 is a fragmentary, sectional view on an enlarged scale, said section being on the line 4—4 of Fig. 1, viewed in the direction of the arrow; Fig. 5 is a section on the line 5—5 of Fig. 1, looking in the direction of the arrows; Fig. 6 is a plan on an enlarged scale, of the lower ends of the picking rolls and adjacent mechanism; Fig. 7 is an end view partly in section, of one of the picking rolls, showing the manner in which it is yieldingly supported; Fig. 8 is a section on the line 8—8 of Fig. 7, looking in the direction indicated by the arrow, and Fig. 9 is a cross section through the husking rolls, the chutes leading thereto and the open-faced apron and riddle arranged underneath.

The machine as preferably constructed, comprises four triangular frames, 1, 2, 3 and 4 arranged at the forward part thereof and in vertical planes, each frame consisting of bottom or tie beams 5, inclined or truss beams 6 rigidly connected at the forward end of the beams 5, and substantially vertical posts 7 rigidly securing the opposite ends of the beams 5 and 6 together. The posts 7 of all four of the triangular frames are connected together, as shown in Fig. 3, by a crossbar 8; also the lower ends of the posts 7 of the intermediate frames are connected by a crossbar 9. The bottom or tie beams 5, as shown in Figs. 1 and 2, are extended at the rear of the post 7, preferably at a slightly different angle, where they are connected together and support a box or trough receptacle 10. This receptacle is further connected to the frames 1, 2 and 3 at the top of the post 7, by rearwardly-inclined struts 11.

Between the frames 1 and 2 is journaled in the lower ends of the posts 7, an axle 12, to which is rigidly secured a wide and preferably ribbed driving wheel 13. This wheel, in connection with a somewhat narrower wheel 14, carried by a stub axle 15, at the outside of the frame constitutes the means for supporting the machine.

Fixed to the axle 12 adjacent to the driving wheel 13, preferably at the inside thereof, is a sprocket wheel 16 which is connected to a sprocket wheel 17, by a chain 18. The sprocket wheel 17 is journaled on a driving shaft 19, which in turn is journaled in suitable bearings near the upper ends of the posts 7. The hub of the sprocket wheel 17 is extended at one side, where it is formed with a suitable clutch member coacting with a slidable and corresponding member 20 splined to the shaft 19. The clutch is operated by a hand lever 21 pivoted on a depending support 22 and having the usual or other preferred connection with the slidable clutch member 20.

Located between the truss beams 6 of the frames 3 and 4, and likewise inclined, are picking rolls 23 and 24, said rolls being supported at each end from the beams 6 in yielding bearings, the construction of which is best shown in Figs. 6, 7 and 8. These bearings comprise brackets 25 rigidly secured to the beams, and have counterbored, overhanging, tubular members 26 at their upper ends. Passing through these tubular members is the stem or shaft 27 of a bearing block 28, the latter surrounding and journaled on a pin 29 centrally secured to the lower conical end of each roll. As shown in Fig. 8, the block 28, as also the head of the pin 29, are of the same taper as the end of the roll and form a continuation thereof. Journaled on a reduced portion of each of the bearing blocks 28, is a link 30, the lower end of which is pivotally connected at 31 to the extremity of the bracket 25. A spring 32 is interposed between the bearing block 28 and the member 26, and is substantially inclosed and protected by the counterbored portion of the same. The construction of the yielding bearings at the upper ends of the rolls is practically the same as those just described, differing only in that the bearing blocks 28 surround the reduced and extended ends 33 of the rolls, this construction, as is apparent, adapting the picking rolls to laterally yield and separate when forced apart. The distance the rolls approach each other under the influence of the springs may be regulated by adjusting the lock-nuts on the ends of the stems 27.

The rolls 23 and 24 are each provided with a spiral rib 34 with the convolutions of one rib arranged between the convolutions of the other, and are of such pitch as to draw the stalks of corn rearwardly as the rolls are revolved. The stalks of corn are fed to the picking rolls and straightened to a vertical position on entering the machine, by chains 35 carrying projecting curved fingers 36. These chains are arranged at the forward end of and above the picking rolls and pass about large sprocket wheels 37 and somewhat smaller sprocket wheels 38 located in advance thereof, the arrangement of said sprocket wheels providing a V-shaped entrance between the chains, as clearly shown in Fig. 6. The conical ends of the picking rolls are shielded from the chains, by plates 39 carried on supports 40 secured to the adjacent beams 6, the opposed edges of said plates conforming to the adjacent portions of their respective chains 35. The sprocket wheels 37 are secured to shafts 41 journaled in suitable bearings, and carrying at their lower ends, as best shown in Figs. 2 and 5, bevel pinions 42. These pinions mesh with corresponding pinions 43 fixed to the lower ends of shafts 44, said shafts being journaled in bearings 45 depending from the beams 6, and having fixed to their opposite and upper ends, bevel pinions 46, shown in dotted outline in Fig. 4, said last-named pinions meshing with bevel pinions 47 fixed to the driving shaft 19, as best illustrated in Fig. 3.

Journaled in the posts 7 of the frames 3 and 4, is a shaft 48, carrying at each side of its center bevel pinions 49, and intermediate thereto a pinion 50, this last-named pinion meshing with a gear 51 fixed to the driving shaft 19. Meshing with the pinions 49 are bevel pinions 52 carried at the inner ends of shafts 53, the outer ends of said shafts extending beyond the struts 11 and carrying sprocket wheels 54 arranged in alinement with similar sprocket wheels 55 fixed to the reduced ends 33 of the picking rolls, the sprocket wheels 54 and 55 being connected by chains 56. From this construction it is apparent that as the machine moves forward, with the clutch on the driving shaft engaged, the picking rolls will be caused to revolve toward each other and the chains and fingers carried thereby will act to straighten the stalks and draw them into the machine.

Journaled between the beams 6 and 7 of the frames 2 and 3, is a roller 57, as shown in Fig. 5, over which passes an apron 58, which also passes over a similar roller 59 shown in Fig. 4, journaled between the central posts 7, this arrangement of the rollers locating the apron at an inclination and at the center of the machine. At opposite ends of the roller 59 are fixed gears 60, which mesh with somewhat larger gears 61 fixed to the driving shaft 19. The gears 60 also mesh with gears 62 fixed to a shaft 63 journaled in the posts 7 of the frames 2 and 3 directly below the roller 59. The gears 62, as best shown in Figs. 3 and 4, have opposed bevel toothed faces 64 which mesh with bevel pinions 65, these last-named pinions being fixed to the reduced ends 65ª of outside husking rolls 66. Fixed to each of the rolls 66, preferably adjacent to the pinions 65, are pinions 66ª intergearing each pair of rolls together. A boxing 67 surrounds the shaft 63, as best shown in Figs. 3 and 4, and provides guides for bearing blocks 68 in which the adjacent reduced ends of the husking rolls are journaled. The husking rolls are arranged in pairs, preferably two, and are rearwardly inclined to the receptacle 10 in which their adjacent reduced ends are journaled in a boxing 67ª similar in all respects to the boxing 67 just described. The outside bearing blocks 68 in both the boxings 67ª and 68 are fixed, while inner blocks are slidably mounted and forced from each other by springs 69, as shown in Fig. 3.

Each of the husking rolls 66 is constructed with a spiral groove 70 and an intermediate spiral rib 71, the arrangement of the grooves and ribs on each roll being such as to be opposed, respectively, to the ribs and grooves of the roll with which it coöperates, and the pitch of the ribs and grooves acting to work the ears of corn rearwardly as they are received from a chute 72. This chute, which is in the form of a double V as shown in Figs. 1, 4 and 9, receives the ears of corn from the inclined apron 58, and by reason of its shape, turns said ears lengthwise as they discharge on the husking rolls. Pins 73 projecting from the circumference of the husking rolls and intermeshing with corresponding recesses 73ª in said rolls as they revolve, act to cut the husks or leaves from the ears, whereby they are readily removed by the action of the ribs and opposed grooves, the rolls laterally yielding by reason of the spring 69, should they become choked.

Arranged under the husking rolls is an open-faced apron, consisting of crossbars 74 attached to belts 75, the latter passing over a roller 76 carried by a shaft 77 journaled in the posts 7 of the frames 2 and 3. The opposite and lower end of the apron passes over rollers 78 fixed to a shaft 79 journaled in an opening in the wall of the receptacle 10, this construction being best shown in Fig. 9. At one end of the shaft 77 is fixed a sprocket wheel 77ª, which is connected to a similar sprocket wheel 77ᵇ fixed to the driving shaft 19, by a chain 77ᶜ. Directly under the top length of the apron is located a riddle 80, which conforms to the inclination of the apron and separates the grain from the husks, the latter being carried by the crossbars 74 of the apron, in the direction indicated by the arrow, are discharged at the front of the machine. The grain passing through the riddle falls upon a plate 81 located under the bottom length of the riddle and in contact with the crossbars 74, the latter acting to carry the grain into the receptacle 10 as the apron is driven. The walls of the receptacle, as shown in Fig. 2, are extended at one side of the machine at an inclination, and have journaled therein a shaft 82 carrying a roller 83, said shaft having also secured thereto at one end, a pulley 84, which is driven by a belt 85 passing over a pulley 86 fixed to the driving shaft 19. The belt 85 is turned at the proper angle to lead to the pulley 84, by a pulley 87 carried at one side of the receptacle 10, as shown in Figs. 1 and 2. Journaled in the end of the receptacle 10 is a shaft 88 carrying a roller 89, which is connected to the roller 83 by an endless belt or apron 90 and forming, in connection with the extended sides of the receptacle, an elevator. This elevator receives the grain and discharges it directly into a wagon or other means arranged under it. As shown in Figs. 2 and 4, the receptacle 10, as also the elevator, are constructed with inclined plates 91 at opposite sides of the apron 90, operating to prevent the grain from wasting therefrom.

Between the forward ends of the frames 1 and 2, is a tongue 92 rigidly connected at its inner end to a bracket 93, the latter having trunnions 94 at opposite sides journaled in bearings carried by the adjacent beams 5. The tongue is guided in advance of the bracket 93 between standards 95 carried by the beams 5 and having journaled in their upper ends, on a pin or bolt 96, a lever 97. The lever 97 carries a spring-pressed bolt 98 designed to engage in the notched face of an arc 99 fixed to the tongue 92, and to which it is also concentrically pivoted at 99ª. The bolt 98 is operated at the handle end of the lever by a pivoted grip 100, which is within convenient reach of a seat 101 attached at the outside of the frame 1, as shown in Figs. 1 and 2, said seat being provided with a projecting foot-rest 102. By the adjustment of the lever 97, the driver is enabled to control the elevation of the picking rolls as the harvesting and husking proceeds.

Although I have described the preferred construction and arrangement of the machine, it is obvious that the same may be materially modified without departing from the spirit of my invention or sacrificing any of the advantages thereof.

Having thus described my invention I claim as new and desire to secure by Letters Patent:

1. In a harvesting machine, in combination, two vertical frames, brackets rigidly secured to said frames, bearing blocks slidably supported on said brackets, picking rolls journaled on said bearing blocks, springs interposed between the blocks and brackets, and links journaled on the bearing blocks and pivoted to the brackets.

2. In a harvesting machine, in combination, frames, brackets having counterbored tubular members overhanging the frames, bearing blocks having stems slidably supported in said members, picking rolls journaled in said bearing blocks, springs seated in the counterbored portion of said members and pressing on said blocks, and links connecting said blocks with said brackets.

3. In a harvesting machine, in combination, a frame, forwardly and downwardly-inclined picking rolls journaled at one side of the frame, rearwardly and downwardly-inclined husking rolls journaled at the center of the frame, an apron arranged adjacent to the picking rolls and discharging on the husking rolls, a receptacle supported on the frame at the rear of the machine, and an apron arranged under the husking rolls and discharging into said receptacle.

4. In a harvesting machine, in combination, a frame, forwardly and downwardly-inclined picking rolls journaled at one side of the frame, rearwardly and downwardly-inclined husking rolls journaled at the center of the frame, an apron arranged adjacent to the picking rolls and discharging on the husking rolls, a receptacle supported on the frame at the rear of the machine, an apron arranged under the husking rolls and discharging into said receptacle, and an elevator leading from said receptacle.

5. In a harvesting machine, in combination, two pairs of vertical frames, a driving wheel at one side of the machine arranged between the members of one pair of and supporting said frames, a second wheel supporting the opposite side of the machine and arranged at the outside of the other pair of frames, forwardly and downwardly-inclined picking rolls journaled between the pair of frames adjacent to said last-named wheel, a driving shaft journaled in said frames, means for driving said shaft from the driving wheel, and means for driving the rolls from the driving shaft.

6. In a harvesting machine, in combination, two pairs of vertical frames, forwardly and downwardly-inclined picking rolls journaled at one side of the machine between one pair of said frames, a tongue connected between the other pair of frames at the opposite side of the machine, rearwardly and downwardly-inclined husking rolls journaled between the two pairs of frames at the rear of the machine, and an apron arranged between the two pairs of frames at the front of the machine and discharging on the husking rolls.

7. In a harvesting machine, in combination, two pairs of vertical frames, a driving-wheel and a second wheel supporting said frames, said driving-wheel being arranged between one pair of said frames, and the second wheel being arranged at the outside of the machine, a pair of downwardly and forwardly-inclined picking rolls journaled between a pair of said frames adjacent to said second wheel, a tongue connected between the other pair of said frames adjacent to the driving-wheel, rearwardly and downwardly-inclined husking rolls arranged between the two pairs of frames at the rear of the machine, and an apron arranged between the two pairs of frames at the front of the machine and discharging on said husking rolls.

8. The combination of downwardly and forwardly inclined picking rolls, bearings in which the rolls are journaled, resilient means forcing the bearings of opposite rolls toward each other, and means pivotally supporting the bearings, mounted to freely swing approximately transversely of the rolls.

In testimony whereof I have signed my name to this specification in the presence of two subscribing witnesses.

FREDERICK W. WELLENSIEK.

Witnesses:
DANIEL T. HILL,
ALBERT F. KENDLE.